United States Patent [19]
Turner

[11] Patent Number: 5,751,223
[45] Date of Patent: May 12, 1998

[54] ELECTRONIC IDENTIFICATION SYSTEM

[75] Inventor: Edwin Turner, Marlow, England

[73] Assignee: International Computers Limited, Putney, England

[21] Appl. No.: 618,127

[22] Filed: Mar. 19, 1996

[30] Foreign Application Priority Data

Mar. 22, 1995 [GB] United Kingdom ............ 9505810

[51] Int. Cl.[6] .............. H04Q 5/22; H04Q 7/00; G08B 26/00; G08B 23/00
[52] U.S. Cl. .............. 340/825.54; 455/31.1; 455/37.1; 340/505; 340/573; 340/571; 340/572
[58] Field of Search .............. 340/825.54, 825.69, 340/825.72, 825.5, 825.36, 505, 568, 573, 572; 455/31.1, 37.1

[56] References Cited

U.S. PATENT DOCUMENTS

| | | | |
|---|---|---|---|
| 4,839,642 | 6/1989 | Batz et al. | 340/825.54 |
| 5,103,222 | 4/1992 | Hogen Esch et al. | 340/825.54 |
| 5,124,699 | 6/1992 | Tervoert et al. | 340/825.54 |
| 5,235,326 | 8/1993 | Beigel et al. | 340/825.54 |
| 5,367,303 | 11/1994 | Waltz | 342/37 |
| 5,517,194 | 5/1996 | Carroll et al. | 342/50 |
| 5,537,105 | 7/1996 | Marsh et al. | 340/825.54 |

*Primary Examiner*—Michael Horabik
*Assistant Examiner*—Anthony A. Asongwed
*Attorney, Agent, or Firm*—Lee, Mann, Smith, McWilliams, Sweeney & Ohlson

[57] ABSTRACT

An electronic identification system e.g. for identifying goods in a retail store, comprises an interrogator and a number of transponders. Each transponder includes a number of data registers, and a counter for selecting the registers one at a time in sequence. When the transponder receives an interrogation signal from the interrogator, it returns a response signal containing data from the currently selected register. When the transponder receives a switch signal from the interrogator, it steps the counter on to select the next register in the sequence. One of the bits in the selected register may be used as a mode switching bit, for switching the response signal between a normal power level and a reduced power level.

9 Claims, 2 Drawing Sheets

ELECTRONIC IDENTIFICATION SYSTEM

BACKGROUND TO THE INVENTION

This invention relates to an electronic identification system comprising a plurality of transponders, and an interrogator for interrogating the transponders to obtain information stored in the transponders. The invention also relates to a transponder for use in such an identification system. The invention is particularly, although not exclusively, concerned with an electronic identification system using radio frequency (RF) technology for communication between the interrogator and the transponders.

Such an electronic identification system is described for example in European Patent Applications EP 0494114, EP 0585132 and EP 0598624, and in PCT Patent Application WO 93/17404.

Such systems have many potential applications, such as tagging goods, mail, vehicles or animals. For example, such a system could be used in a retail store to identify goods presented by a customer at a checkout. The transponders could be incorporated in tags attached to the goods or to their packaging. Another application is in the control of packages through a transit route. In this case the transponders would be attached to the packages and interrogated to obtain routing information.

In conventional transponders of this kind, the data to be output from the transponder when interrogated is stored in a register. In some applications, the amount of stored data may be quite large: for example, in a package routing system, it may be required to hold routing information for each of a number of points in a chain. However, the more data that is stored, the longer it takes to transmit it all when the transponder is interrogated. Moreover, the interrogator has to be able to select the appropriate information from a long string of data.

One object of the invention is to provide a novel electronic identification system which is capable of overcoming these problems.

SUMMARY OF THE INVENTION

According to the invention there is provided an electronic identification system comprising at least one interrogator and a plurality of transponders, wherein each of said transponders includes:

(a) a plurality of registers containing data;
(b) selection means for selecting one of said registers;
(c) means for returning a response signal to the interrogator in response to an interrogation signal from the interrogator, said response signal containing data from the currently selected one of said registers; and
(d) control means for causing said selection means to select another one of said registers.

DESCRIPTION OF AN EMBODIMENT OF THE INVENTION

One embodiment of the invention will now be described by way of example with reference to the accompanying drawings.

Figure 1:
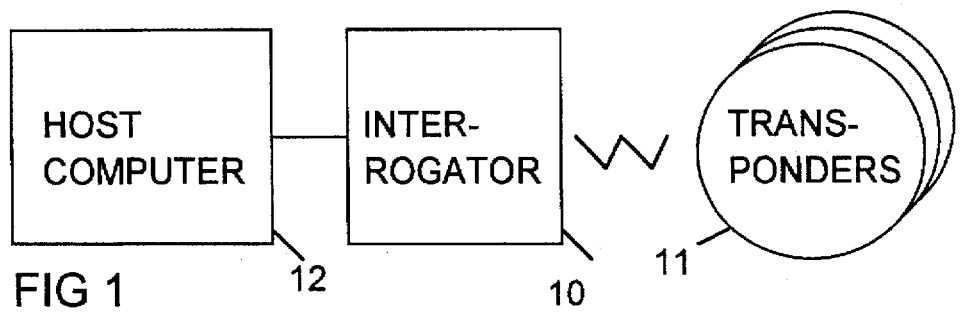
FIG. 1 is a schematic diagram showing an electronic identification system in accordance with the invention.

Referring to FIG. 1, this shows an electronic identification system comprising an interrogator 10 and a plurality of transponders 11. The interrogator is connected to a host computer 12.

Figure 2:
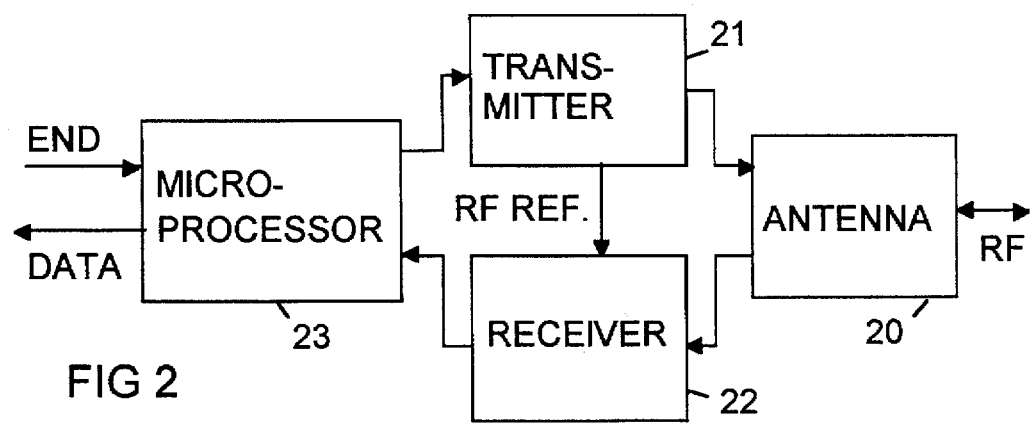
FIG. 2 is a block diagram of an interrogator.

Referring to FIG. 2, this shows the interrogator in more detail. The interrogator comprises an RF antenna 20, a transmitter circuit 21, a receiver circuit 22, and a controlling microprocessor 23. The antenna 20 is connected to both the transmitter and receiver circuits, and serves both for transmission and reception. The transmitter circuit is controlled by the microprocessor and, when powered up, generates an interrogation signal, comprising a continuous RF carrier signal.

As will be described, any transponders that detect the interrogation signal return a response signal, comprising an RF carrier signal modulated with coded data. The response signal is received by the antenna 20, and passed to the receiver circuit 22. The receiver circuit demodulates the response signal, by mixing it with an RF reference signal derived from the transmitter circuit, and passes the demodulated signal to the microprocessor 23 for decoding. The decoded data is then passed to the host computer 12. When the host computer detects that all the transponders have responded (e.g. because a time-out period has expired with no further responses) the host computer sends an END signal to the microprocessor.

Figure 3:
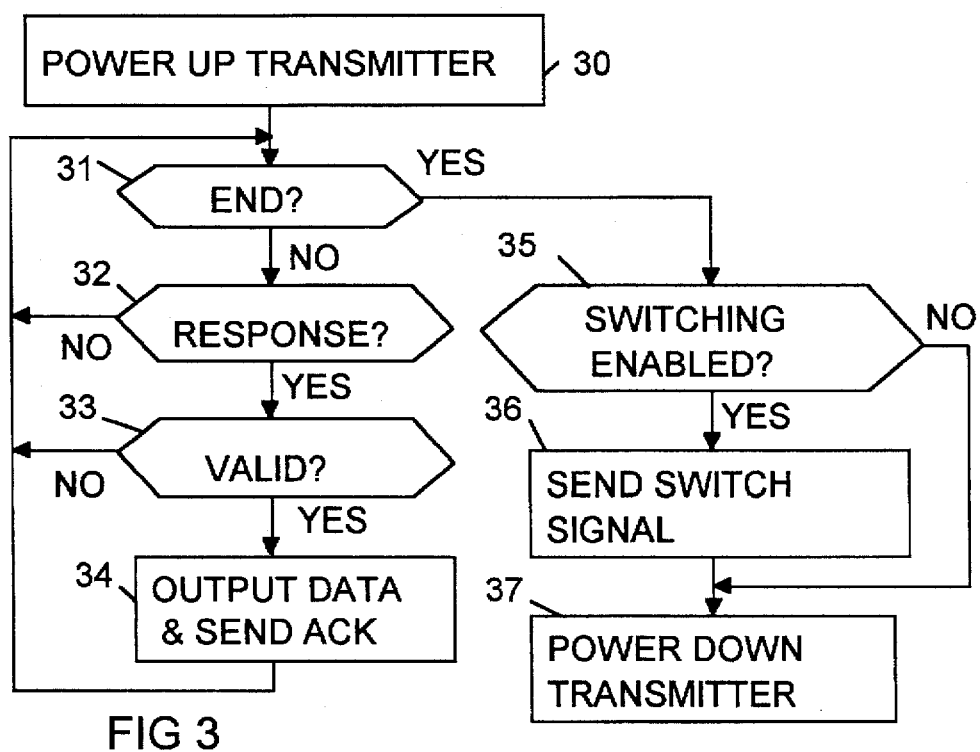
FIG. 3 is a flow chart showing the operation of the interrogator.

FIG. 3 shows a flowchart of the operation of the microprocessor 23. Initially, the microprocessor powers up the transmitter (step 30), so as to start transmitting the interrogation signal. The microprocessor then enters a loop in which it checks whether the END signal is present (step 31) and whether a response signal has been received from a transponder (step 32). When a response is received, the microprocessor decodes it, and performs a redundancy check to check whether the response is valid (step 33). If the response is not valid (e.g. because two transponders have returned responses simultaneously, so that their responses interfere with each other), the response is ignored and the microprocessor returns to await another response. When a valid response is detected, the microprocessor outputs the decoded data to the host computer and instructs the transmitter to send an ACK signal (step 34). The ACK signal consists of an interruption to the interrogation signal for one clock period, and serves as an acknowledgement to the transponder that its response has been correctly received. The microprocessor then loops back to step 31 to await the next response.

The microprocessor repeats this process until an END signal is received from the host computer at step 31, indicating that responses have been received from all the transponders. It then checks whether or not switching is enabled in the interrogator (step 35). If so, a SWITCH signal is sent (step 36). This signal consists of an interruption of the RF carrier for two clock periods, and hence is distinguished from the ACK signal. As will be described, the SWITCH signal steps a counter in each transponder that receives it. If switching is not enabled, no SWITCH signal is sent. Finally, the transmitter is powered down (step 37).

Figure 4:
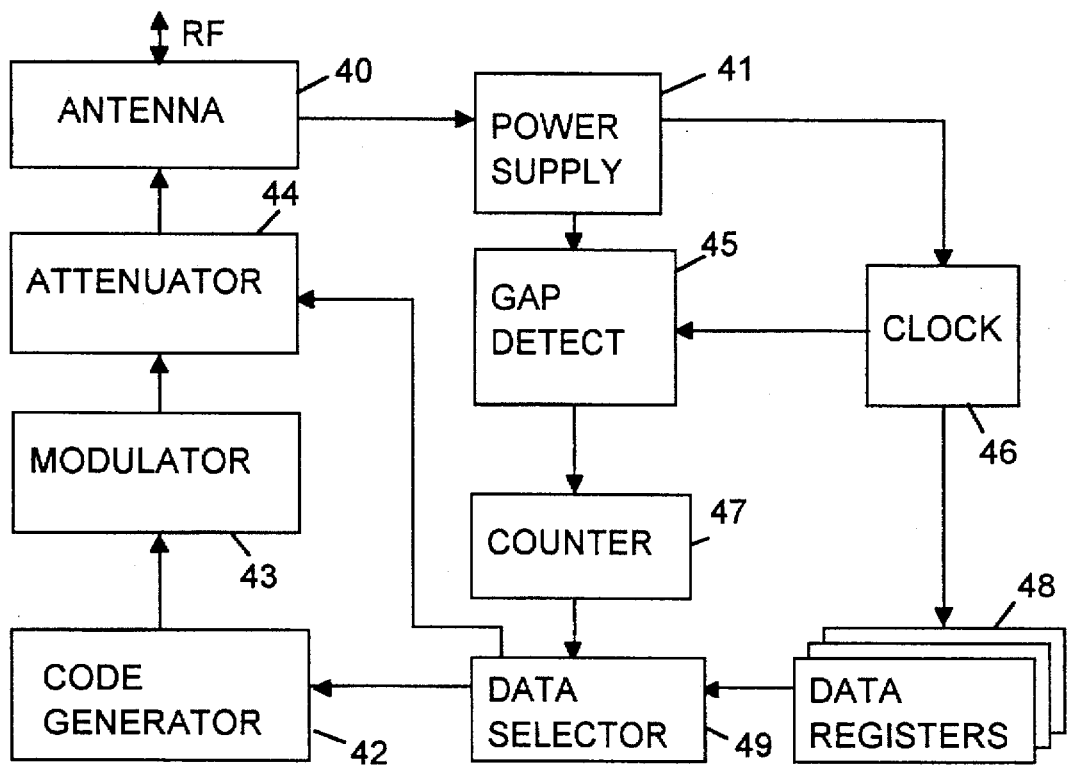
FIG. 4 is a block diagram of a transponder.

Referring now to FIG. 4, this shows one of the transponders in more detail. The transponder comprises an antenna 40, a power supply 41, a code generator 42, a modulator 43, a variable attenuator 44, gap detection logic 45, a clock circuit 46, a counter 47, a plurality of data registers 48, and a data selector 49.

The antenna 40 serves for both transmission and reception and may, for example, comprise a printed conductive pattern. The power supply 41 comprises a diode, which rectifies the received RF signal and charges a capacitor. Thus, the transponder derives all its power from the incoming RF signal, and does not require any internal power source. The power supply provides power for the code generator, clock circuit and gap detection logic.

Each of the data registers 48 holds a data item to be returned to the interrogator when the transponder is interrogated. The data registers 48 are stored in a non-volatile memory, so that their contents are preserved even when the transponder is powered down. This non-volatile memory may be of the type which can be re-written, or may be of the type which, once written to, cannot be re-written.

The data selector circuit 49 selects one of these data registers, according to the value of the counter 47. The output of the selected data register is fed to the code generator 42, which encodes the contents of this data register, e.g. using a Manchester code. The modulator 43 modulates this coded signal on to the carrier wave received from the antenna, and feeds this modulated carrier by way of the attenuator 44 to the antenna 40, for transmission as a response signal.

One of the bits (e.g. the most significant bit) of the selected data register is used as a control bit for the attenuator 44. When this bit is true, the attenuator reduces the power level of the response signal from its normal level to a lower level. In other words, the transponder has two modes: a normal power mode and a reduced power mode. In the normal power mode, the signal level is such that it can be detected by the interrogator from a range of typically 2 meters. In the reduced power mode, on the other hand, the signal level is such that it can be detected only from a range of 10 centimeters or less.

The gap detection logic 45 detects both ACK signals and SWITCH signals. The SWITCH signal causes the counter 47 to be incremented, so that it selects the next data register in sequence. The counter 47 is cyclic, so that when it passes its maximum count value, it returns to zero. The counter 47 is stored in a re-writable non-volatile memory, so that it its contents are preserved even when the transponder is powered down.

Figure 5:
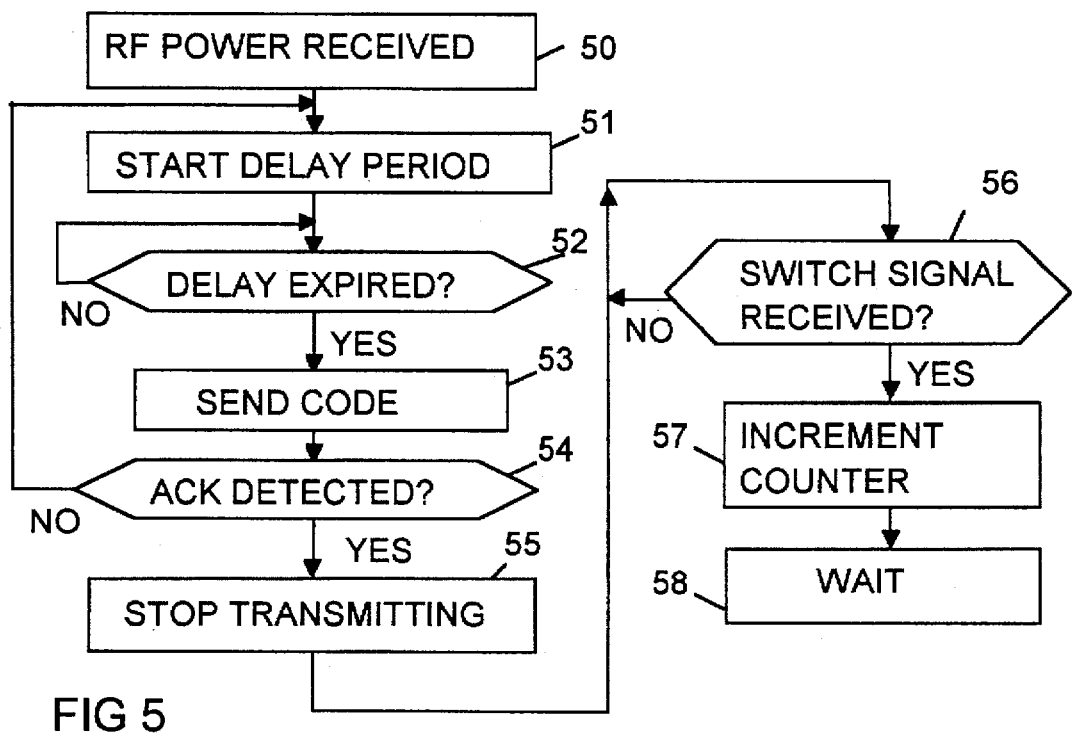
FIG. 5 is a flow chart showing the operation of the transponder.

FIG. 5 is a flowchart showing the operation of the transponder. The code generator is powered up whenever an interrogation signal is received from the interrogator (step 50). When powered up, the code generator starts an internal counter, which generates a preset delay period (step 51). This delay period is chosen at random for each transponder so that, in general, each transponder has a different delay. The transponder then enters a loop (step 52) in which it waits for this delay period to expire. When the delay period expires, the code generator sends the data from the currently selected data register to the modulator for transmission as a response to the interrogation signal (step 53).

The transponder then waits for a predetermined number of clock periods, and then checks whether an ACK has been detected (step 54). If no ACK is detected at the appropriate time, this indicates that the response has not been correctly received by the interrogator, probably because of interference with another transponder. In this case, the transponder returns to step 51, restarting the delay period, and the response is retransmitted after the delay expires. It can be seen that, if the delay periods of the two interfering transponders are different, they will retransmit at different times, and so avoid interference.

When an ACK is detected, transmission is disabled (step 55), so that no further responses are sent. The transponder then enters a loop (step 56), waiting for a SWITCH signal. When a SWITCH is received, the transponder increments the counter 47 (step 57) and then enters an idle loop (step 58), in which it remains until power is removed. If, however, the transponder is powered down before any SWITCH signal is received, the counter remains in its current state.

One application of the identification system described above is in a system for automatically routing packages. The transponders may, for example, be incorporated into tags or labels attached to packages to be routed. The registers in each transponder are programmed with the addresses of successive sorting points along the route.

Each sorting point along the route includes an interrogator which reads the transponders attached to a batch of packages, and passes the information to its local host computer, so that the computer can determine how the packages are to be routed to the next routing point. When all the packages in a batch have been interrogated, the interrogator issues a SWITCH signal, which causes the counters in all the transponders to be incremented, so that the next register is selected.

An alternative application of the identification system described above is in a retail store. Each item in the store has a label containing a transponder. The first register in each item contains an identity code identifying the item. The control bit of this first register is set to "1" so that when this register is selected, the transponder is put into its high power mode. The second register in each item contains other information, which may be required after purchase of the item. The control bit of this second register is set to "0" so that when this register is selected, the transponder is put into its low power mode. Initially, the counter in each transponder is set to select the first register.

When a customer wishes to purchase one or more items, the customer passes the items through a checkout station which contains an interrogator as described above. The interrogator interrogates the transponders, so as to obtain their identity codes, and passes these codes to a point-of-sale computer for pricing. After all the transponders have been interrogated the interrogator sends a SWITCH signal. This steps the counters in all the transponders so that they now select the second register. This puts all the transponders into the reduced power mode.

The store has one or more anti-theft gates, positioned at the store exits. Each of these gates contains an interrogator, which interrogates any transponders that pass it. The anti-theft gate is designed so that it is impossible to bring any transponder closer than about 15 centimeters to the antenna of the interrogator. This means that any transponder in the reduced power mode will not be detected by the anti-theft gate, because its signal power level is insufficient to be detected over a range greater than 10 centimeters. However, any transponder still in the normal power mode will be detected, and this will trigger an audible or visible alarm.

In summary, it can be seen that when goods are taken through the checkout, their transponders are modified so as to reduce their signal power levels. This ensures that the goods will not erroneously trigger the anti-theft gate when they are taken out of the store, or if they are subsequently brought back into the store (e.g. as an item of clothing worn by the customer). However, it is still possible to interrogate the transponders if required, using equipment that can accept the reduced signal power level. For example, a customer services desk in the store may contain an interrogator, positioned immediately under the counter so that transponders may be brought very close to the interrogator's antenna.

Such an interrogator would therefore be able to read the transponders of articles that had been purchased and returned for exchange or refund.

It will be appreciated that many modifications may be made to the system described above without departing from the scope of the invention.

I claim:

1. An electronic identification system comprising at least one interrogator and a plurality of transponders, wherein each of said transponders includes:
   (a) a plurality of registers stored in non-volatile memory, containing data;
   (b) a counter stored in non-volatile memory;
   (c) means for receiving an interrogation signal transmitted by said interrogator;
   (d) means responsive to said interrogation signal for using said counter to select a data item from one of said registers and for transmitting said data item to the interrogator; and
   (e) control means for incrementing said counter in response to a switching signal from said interrogator.

2. A system according to claim 1 wherein said interrogator includes means for selectively transmitting the switching signal after receiving response signals from said transponders.

3. A system according to claim 1 including means for using a predetermined bit of the currently selected one of said registers to switch the transponder between a first mode, in which said response signal has a first predetermined power level, and a second mode in which said response signal has a second, lower predetermined power level.

4. A system according to claim 3 including a plurality of interrogators, wherein at least one of said interrogators is capable of detecting said response signal at said first power level but not at said second power level, and wherein at least one other of said interrogators is capable of detecting said response signal at both said first and second power levels.

5. A transponder for use in an electronic identification system, the transponder comprising:
   (a) a plurality of registers stored in non-volatile memory, containing data;
   (b) a counter stored in non-volatile memory;
   (c) means for receiving an interrogation signal;
   (d) means responsive to said interrogation signal for using said counter to select a data item from one of said registers and for transmitting said data item; and
   (e) control means for incrementing said counter in response to a switching signal.

6. A transponder according to claim 5 including means for using a predetermined bit of the currently selected one of said registers to switch the transponder between a first mode, in which said response signal has a first predetermined power level, and a second mode in which said response signal has a second, lower predetermined power level.

7. An electronic identification system comprising at least one interrogator and a plurality of transponders, wherein each of said transponders includes:
   (a) a plurality of registers containing data;
   (b) selection means for selecting one of said registers;
   (c) means for receiving an interrogation signal transmitted by said interrogator;
   (d) means responsive to said interrogation signal for reading a data item from a currently selected one of said registers and for transmitting said data item to the interrogator; and
   (e) control means for causing said selection means to select another one of said registers; and
   (f) means for using a predetermined bit of the currently selected one of said registers to switch the transponder between a first mode, in which said response signal has a first predetermined power level, and a second mode in which said response signal has a second, lower predetermined power level.

8. A system according to claim 7 including a plurality of interrogators, wherein at least one of said interrogators is capable of detecting said response signal at said first power level but not at said second power level, and wherein at least one other of said interrogators is capable of detecting said response signal at both said first and second power levels.

9. A transponder for use in an electronic identification system, the transponder comprising:
   (a) a plurality of registers containing data;
   (b) selection means for selecting one of said registers;
   (c) means for receiving an interrogation signal;
   (d) means responsive to said interrogation signal for reading a data item from a currently selected one of said registers and for transmitting said data item;
   (e) control means for causing said selection means to select another one of said registers; and
   (f) means for using a predetermined bit of the currently selected one of said registers to switch the transponder between a first mode, in which said response signal has a first predetermined power level, and a second mode in which said response signal has a second, lower predetermined power level.

* * * * *